US012717642B2

(12) United States Patent
Rattihalli et al.

(10) Patent No.: US 12,717,642 B2
(45) Date of Patent: Aug. 25, 2026

(54) GRAPH BASED REPRESENTATION OF DATA CENTERS TO PREDICT ENERGY CONSUMPTION AND CARBON EMISSION OF THE DATA CENTERS DURING OPERATION

(71) Applicant: Hewlett Packard Enterprise Development LP, Spring, TX (US)

(72) Inventors: Gourav Rattihalli, Milpitas, CA (US); Philipp Raith, Milpitas, CA (US); Dejan S. Milojicic, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 158 days.

(21) Appl. No.: 18/582,192

(22) Filed: Feb. 20, 2024

(65) Prior Publication Data

US 2025/0265527 A1 Aug. 21, 2025

(51) Int. Cl.

| | |
|---|---|
| ***G06F 9/50*** | (2006.01) |
| ***G06F 9/48*** | (2006.01) |
| ***G06Q 10/0637*** | (2023.01) |
| ***G06Q 10/067*** | (2023.01) |

(52) U.S. Cl.

CPC .......... *G06F 9/5072* (2013.01); *G06F 9/4806* (2013.01); *G06F 9/4881* (2013.01); *G06F 9/505* (2013.01); *G06Q 10/06375* (2013.01); *G06Q 10/067* (2013.01); *Y02D 10/00* (2018.01)

(58) Field of Classification Search

CPC ............ G06Q 10/06375; G06Q 10/067; G06F 9/5072; G06F 9/4806; G06F 9/4881; G06F 9/505; Y02D 10/00

See application file for complete search history.

(56) References Cited

U.S. PATENT DOCUMENTS 8,878,852 B1 * 11/2014 Klein .................... H04L 41/065 345/440
2014/0095718 A1 * 4/2014 Daly ..................... G06F 9/5033 709/226
2023/0252285 A1 * 8/2023 Sharma .................... G06N 3/08 706/25

OTHER PUBLICATIONS

Theodoropoulos et al., "Graph neural networks for representing multivariate resource usage: A multiplayer mobile gaming case-study", International Journal of Information Management Data Insights 3, 2023, 14 pages.
Yang et al., "Prediction of the Resource Consumption of Distributed Deep Learning Systems", Sigmetrics/Performance '22 Abstracts, Jun. 6-10, 2022, 2 pages.
Han et al., "Tailored Learning-Based Scheduling for Kubernetes-Oriented Edge-Cloud System", Jan. 17, 2021, 10 pages.

(Continued)

*Primary Examiner* — Charles Guiliano
(74) *Attorney, Agent, or Firm* — Slater Matsil, LLP

(57) ABSTRACT

A method includes generating a first data center graph including a plurality of host graphs, the host graphs representing resources of hosts of a data center, combining the first data center graph with an application signature graph to produce a second data center graph, the second data center graph representing the resource utilization of an application when running on the data center, predicting an energy consumption of the application when running on the data center by processing the second data center graph using a graph neural network (GNN), and scheduling the application on the hosts of the data center based on the predicted energy consumption of the application.

20 Claims, 9 Drawing Sheets

(56) References Cited

OTHER PUBLICATIONS

Tuli et al., “Hunter: AIbased Holistic Resource Management for Sustainable Cloud Computing”, Oct. 28, 2021, 16 pages.
Yang et al., “Prediction of the Resource Consumption of Distributed Deep Learning Systems”, Proceedings of the ACM on Measurement and Analysis of Computing Systems, vol. 6, Issue 2 Article No. 29.

* cited by examiner

G
410
Application Signature
420
Host
Resource 1
Resource 2
Resource 3
+
400
h
410
Application Signature
432
434
436
Resource 1
Resource n
...
0s
10s
20s
30s
Time
422
424
426
440
Application Signature + Current System Usage 710 Generate a plurality of host graphs, the host graphs representing resources of hosts of a data center 720 Compose the plurality of host graphs to form a first graph representing resources of the data center 730 Generate a signature graph, the signature graph being a representation of the isolated resource utilization of an application 740 Combine the first graph with the signature graph to produce a second graph, the second graph representing the resource utilization of the hosts as if the application was running on the hosts of the data center 750 Process the second graph using a graph neural network (GNN) to obtain predictions on energy consumption and carbon emissions of each of the hosts as if the application was running on the data center 760 Schedule the application on the hosts of the data center based on the energy consumption and carbon emission predictions

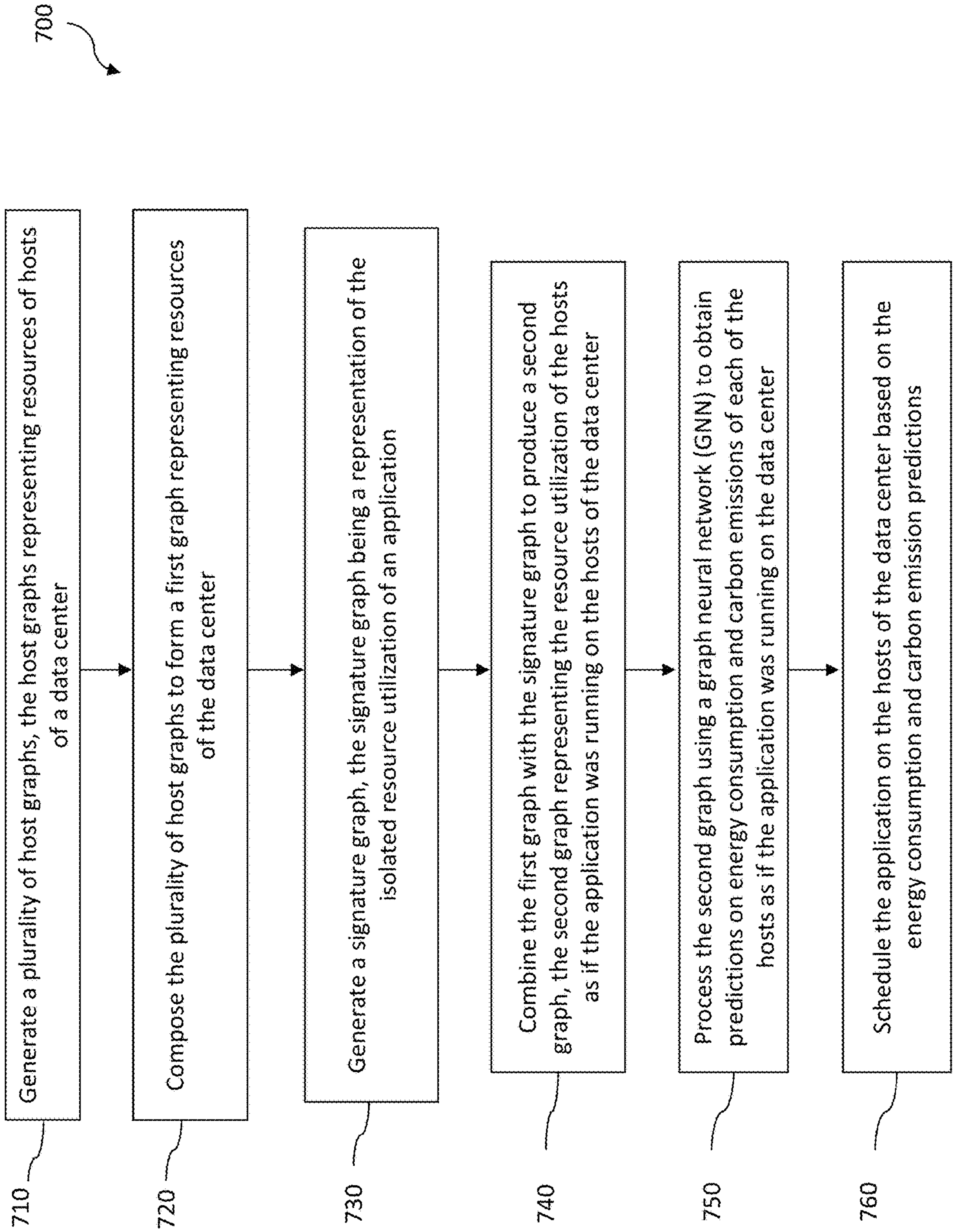

Figure 7

GRAPH BASED REPRESENTATION OF DATA CENTERS TO PREDICT ENERGY CONSUMPTION AND CARBON EMISSION OF THE DATA CENTERS DURING OPERATION

BACKGROUND

A graph is a data structure that includes a set of nodes and a set of edges connecting pairs of the nodes. Nodes, also known as vertices, are fundamental units in a graph. Each node represents an entity or a point in the graph. Edges are connections between pairs of nodes. They represent relationships or interactions between the entities represented by the nodes. Graphs can be used to model relationships between entities. A Graph Neural Network (GNN) is a type of neural network designed to work with graph-structured data. Upon receiving a graph as input, the GNN can perform computations on the nodes and edges of the graph considering both their own features and the features of the neighboring nodes and edges.

BRIEF DESCRIPTION OF THE DRAWINGS

Aspects of the present disclosure are best understood from the following detailed description when read with the accompanying figures.

FIG. 7 illustrates an example method for processing a graph model using a GNN to make predictions, and scheduling an application based on the predictions, according to some implementations;

Corresponding numerals and symbols in the different figures generally refer to corresponding parts unless otherwise indicated. The figures are drawn to clearly illustrate the relevant aspects of the disclosure and are not necessarily drawn to scale.

DETAILED DESCRIPTION

Figure 1:
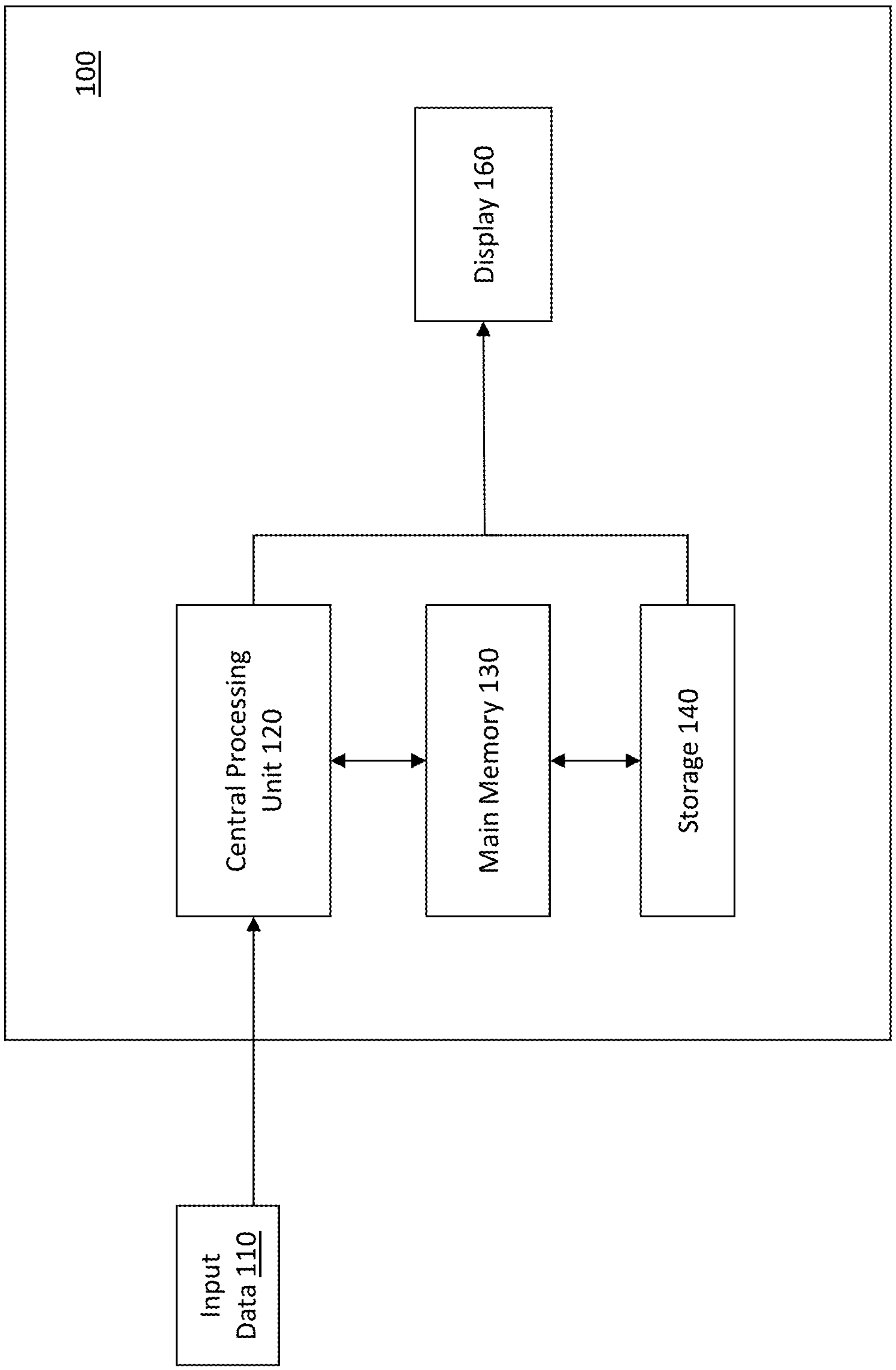
FIG. 1 illustrates an example system to generate a graph based output, according to some implementations.

The following disclosure provides many different examples for implementing different features. Specific examples of components and arrangements are described below to simplify the present disclosure. These are, of course, merely examples and are not intended to be limiting.

Modern data centers have evolved to become more heterogeneous and may include different hardware configurations tailored to specific tasks and functionalities. These different hardware configurations may each have different energy consumption needs and may also contribute to different amounts of carbon emissions, depending on the hardware configuration. Current models or representations of single hosts and data centers are too rigid. For example, these representations may not adequately capture the dynamic environment of a heterogeneous data center. In addition, when attempting to aggregate these representations to a larger scale (e.g., from a single host to a complete data center), the size of these representations increases significantly.

In this disclosure, a host in a data center is modeled as a graph, which includes both static information (e.g., the hardware configuration) and dynamic information (e.g., resource usage) of the host. The host graph model is flexible and composable, and can be scaled up by combining multiple graphs (e.g., each graph representing a respective host) into a combined graph, in order to capture complete data centers instead of just one host. The host graph model and other generated graph models relating to the host, the data center, or the like, can be used as an input for a GNN which is trained on several hardware configurations and can be used for different prediction tasks.

A first example implementation of a prediction task may include generating a signature graph of the resource usage (also called an application signature) of an application. The signature graph can then be combined with the graph model of a host to obtain a combined host graph model. The combined host graph model may be used (e.g., as an input to a GNN) to estimate the energy consumption of the host as if the application would be running on the host.

A second example implementation of a prediction task may include using a workflow graph model to predict a suitable set of configurations for a given workflow and adapt the workflow during runtime in response to the changing environment the workflow is being executed in. For example, if a workload is an application that needs to be managed in a data center, and certain nodes of the workflow graph model represent a workload that can run on different hardware configurations, then each workflow graph model may act as a base to create graphs for hosts and applications to predict energy consumption and/or carbon emission of an optimal workflow. In this way carbon emission rates can be reduced, and the workflow configuration chosen can be optimized to be more energy efficient.

A third example implementation of a prediction task may include using graph models of different hardware configurations as inputs to a GNN, where each of the different hardware configurations is proposed to be simulated as a Digital Twin. The GNN may be used to filter out and eliminate from consideration infeasible hardware configurations which are predicted by the GNN to exceed energy consumption thresholds. In this way, the number of Digital Twin scenarios to be simulated can be reduced.

FIG. 1 illustrates an example system 100 that is intended to generate a graph based output. In an implementation, the system 100 may be a computer (e.g., a server) that plays a role in executing applications, storing data, and providing computational resources within a data center environment. The system 100 may also subsequently be referred to as a host. The system 100 may receive input data 110 that may include sensor data, resource usage data, status data, or the like, from components (both components of the system 100 shown in FIG. 1 and components of the system 100 that are not shown in FIG. 1) of the system 100. The input data 110 is the raw data used by the system 100 to create meaningful graphs. The system 100 may include a central processing unit (CPU) 120 where the input data 110 is processed to ensure it is in a suitable format for generating graphs. For example, the CPU 120 may process the input data 110 and transform it into graph representations. The system 100 may include a main memory 130 which may include a non-transitory computer readable medium that stores programming for execution by the CPU 120. The system 100 may also include storage 140, which may be a mechanism and infrastructure that is used to store and retrieve the data processed by the CPU 120. The storage 140 can take various forms. For example, the storage 140 may include a data store, a database server, or the like. The storage 140 may serve as a central repository for the processed data, making it accessible for graph generation and other analytical tasks. After the graphs are generated by the CPU 120, the graphs may be used as an input into a graph neural network (GNN) for further processing. The GNN may be processed on a separate host from the system 100, and after the GNN processes the graphs, the results of the processing may be presented on a display 160 of the system 100, which may be used to present the results to users through a visualization component. The display 160 could be used to show a graphical user interface (GUI) or the like.

Figure 2B:
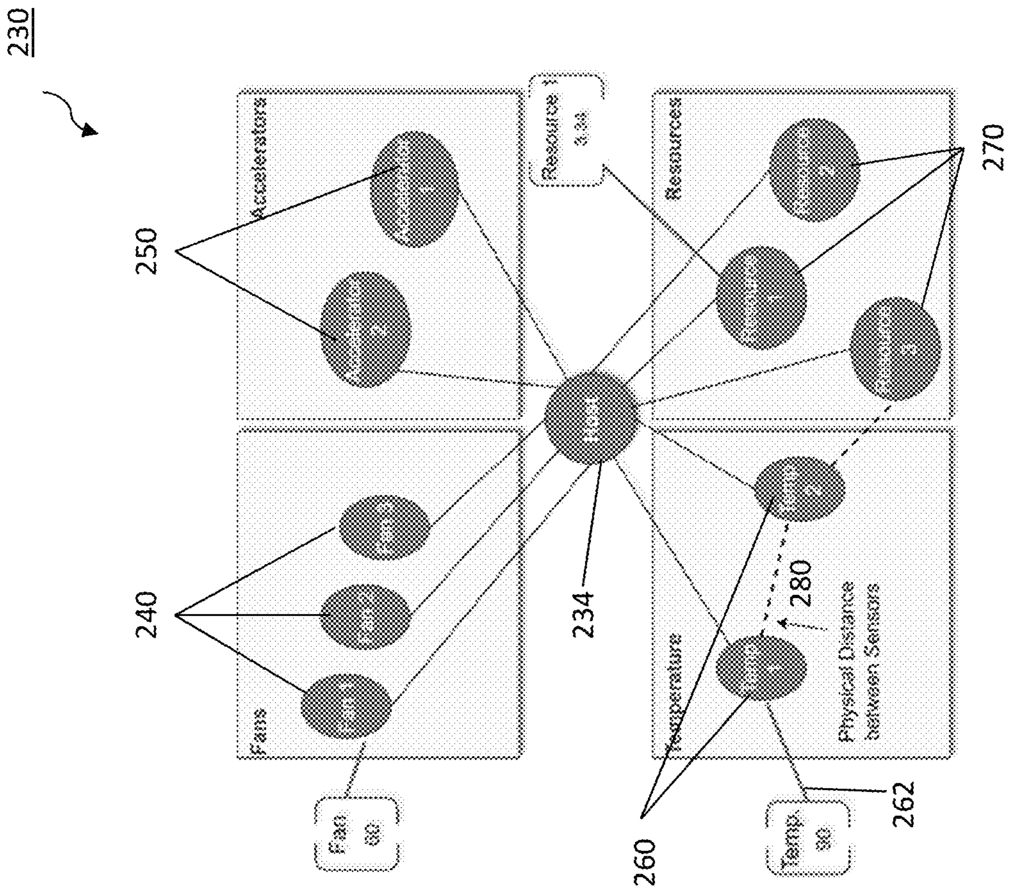
FIG. 2B illustrates a graph model that represents the hardware configuration of the system, according to some implementations.
Figure 2A:
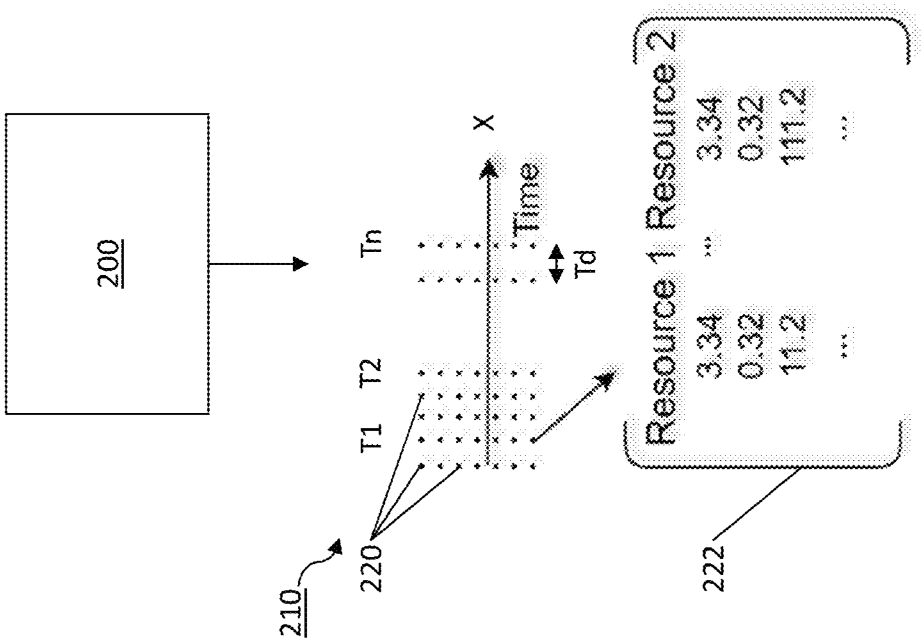
FIG. 2A illustrates a timeline that is used to monitor and capture the state of a system, according to some implementations.

FIG. 2A illustrates a timeline 210 for a system 200, where the timeline 210 may be used to monitor and capture the state of the system 200 over time. The timeline 210 may use the x-axis as a time axis. The system 200 may be similar to the system 100 that was described previously in FIG. 1. Data points 220 are generated from input data (e.g., similar to the input data 110 of FIG. 1) of the system 200, which are plotted along the x-axis. Each of the data points 220 may represent a snapshot at a particular time (e.g., time T1, time T2, . . . time Tn) and shows a momentary view of the system 200's state for resource usage, its hardware configuration, and other aspects of the system 200 at that particular time (e.g., time T1, time T2, . . . time Tn). The data points 220 of the timeline 210 can therefore capture both the static information (e.g., the hardware configuration and physical components) relating to the system 200 and the dynamic information (e.g., the resource utilization of the components of the system 200 which may vary over time) of the system 200. Each data point 220 may represent features of a respective entity (e.g., a physical component or a resource of the system 200, such as a CPU, fan, memory, graphics processing unit (GPU), or the like) using numerical representations (e.g., feature vectors, such as the example feature vector 222 shown in FIG. 2A), wherein each feature of a feature vector corresponds to a specific characteristic or attribute of the entity. As described subsequently in FIG. 2B, these feature vectors may then be used to model the system 200 as a graph (i.e., a graph is generated using the feature vectors).

In an implementation, a time interval (Td) between the data points 220 of the timeline 210 can be varied in order to enable fine-grained monitoring and capture of the state of the system 200 at short time intervals. The short time intervals can be milliseconds, seconds, or the like. In an implementation, the time interval (Td) between the data points 220 of the timeline 210 can be varied in order to enable coarse-grained monitoring and capture of the state of the system 200 at long time intervals. The long intervals can be minutes, hours, days, or the like.

In FIG. 2B, the captured data points 220 of the timeline 210 shown in FIG. 2A may be used to model the system 200 as a graph (e.g., a graph model 230). The graph model 230 may represent the hardware configuration (e.g., generated from the static information of the system 200 in the data points 220) of the system 200 and also runtime information, such as resource utilization (e.g., generated from the dynamic information of the system 200 in the data points 220) of the system 200. The hardware configuration may be a representation of the physical components of the system 200. The graph model 230 may include both the physical components of the system 200 as well as information about the physical components (e.g., a CPU, Memory, operating system (OS) version, field programmable gate array (FPGA), or the like) of the system 200. The graph model 230 may be used to represent a system that may have different possible hardware configurations. This is because the graph model 230 is capable of fully representing different heterogeneous systems that have different hardware configurations (e.g., having different numbers and types of physical components).

The graph model 230 may comprise nodes (also known as vertices) that represent the static and the dynamic information of physical components of the system 200, and a set of edges connecting pairs of the nodes. The graph model 230 may be heterogeneous and may include different types of nodes that represent the different physical components and resources of the system 200. For example, in FIG. 2B, the graph model 230 may include nodes 240, where each node 240 represents a respective heat dissipation fan used to dissipate heat from a component (e.g., a CPU, a GPU, or the like) of the system 200. The graph model 230 may include nodes 250, where each node 250 represents an accelerator (e.g., a specialized processing unit such as a FPGA, GPU, or the like, designed to enhance the performance of specific tasks) in the system 200. The graph model 230 may include nodes 260, where each node 260 represents a respective temperature sensor used to detect a temperature of a component (e.g., a CPU, a GPU, or the like) of the system 200. The graph model 230 may include nodes 270, where each node 270 represents a resource (e.g., CPU speed, CPU threads, CPU cores, GPU clock speed, storage capacity, power output, power efficiency, or the like) that is being monitored and which enables the system 200 to perform its functions. In this way, any number of nodes that include any number of different node types can be included in the graph model 230 to provide a complete representation of the system 200.

The different types of nodes of the graph model 230 may represent dynamic information (e.g., resource utilization that may vary over time) that is relevant to the different physical components of the system 200. For example, when the nodes 240 represent a respective heat dissipation fan that is used to dissipate heat from a component (e.g., a CPU, a GPU, or the like) of the system 200, some of the other nodes may represent dynamic information that may vary over time and that is relevant to that heat dissipation fan, such as fan temperature, fan speed, or the like. In another example, when each of the nodes 250 represent a respective accelerator (e.g., a FPGA, GPU, or the like) of the system 200, the node may represent all static and dynamic information of the respective accelerator. In another example, when the nodes 250 represent a respective accelerator (e.g., a FPGA, GPU, or the like) of the system 200 some of the other nodes may represent dynamic information that may vary over time and that is relevant to that accelerator, such as clock speed, memory bandwidth, or the like. In another example, when the nodes 260 represent a respective temperature sensor, some of the other nodes may represent dynamic information that may vary over time and that is relevant to that temperature sensor, such as a temperature of a component of the system 200, or the like. In another example, when the nodes 270 represent a respective resource of the system 200 that is being monitored and which enables the system 200 to perform its functions, some of the other nodes may also represent dynamic information that may vary over time and that is relevant to that resource, such as storage capacity, power output, power efficiency, or the like.

The nodes in the graph model 230 are connected to a super-node 234 (also referred to as a host node) which includes static information (e.g., number of CPU cores, size of memory, or the like) about the physical system (e.g., the system 200) as well as dynamic information (e.g., the resource utilization of the components of the system 200 which may vary over time) that the graph represents. Thus, the super-node 234 may contain dynamic information that changes over time (e.g., resource utilization by a physical component) and static information that does not change over time (e.g., GPU model, CPU model, or the like). The dynamic information (e.g., resource utilization) of physical components of the system 200 can therefore be monitored (e.g., as shown in FIG. 2A), after which the graph model 230 can be utilized to represent this usage of resources over any given time frame (e.g., ten seconds, or the like).

The edges of the graph model 230 represent relationships or interactions between the physical components of the system 200 that are represented by the nodes. The edges between any two nodes are based on domain knowledge, where relationships between the two nodes are established with an understanding of the domain in which the graph is applied. These relationships may be driven by dependencies, interactions, or associations that are known or relevant within the domain. In this way, nodes within the same domain may be connected using edges. For example, in FIG. 2B, a first node 260 representing a first temperature sensor and a second node 260 representing a second temperature sensor may be shown to have a relationship with each other by connecting the first node 260 and the second node 260 using an edge 280. In addition, the edges of the graph model 230 may also be used to represent relationships or interactions between nodes that represent static information (e.g., a static node) and nodes that represent dynamic information (e.g., dynamic nodes). For example, an edge 262 may connect a node 260 (representing a temperature sensor) with another node representing its dynamic information (e.g., temperature read by the temperature sensor)).

In an implementation, the heterogeneous graph model 230 described above may be converted into a homogeneous graph model by creating a node from each individual value of each feature vector of each node of the graph model 230.

Modeling the system 200 as a graph-based model (e.g., the graph model 230), has various advantages. The graph-based model is flexible and composable, and is able to represent and manage hardware configurations of individual hosts (e.g., the system 200), and also able to represent and manage hardware configurations for entire data centers (e.g. having multiple hosts with different hardware configurations). For example, graph models representing individual hosts of a data center can be composed together to generate a composed graph model that represents and manages the hardware configuration and dynamic information of the entire data center. In addition, the graph-based model (e.g., the graph model 230) of the system 200 allows the capture and monitoring of the system 200 at both short time intervals (e.g., fine-grained monitoring) and long time intervals (coarse-grained monitoring).

Figure 3:
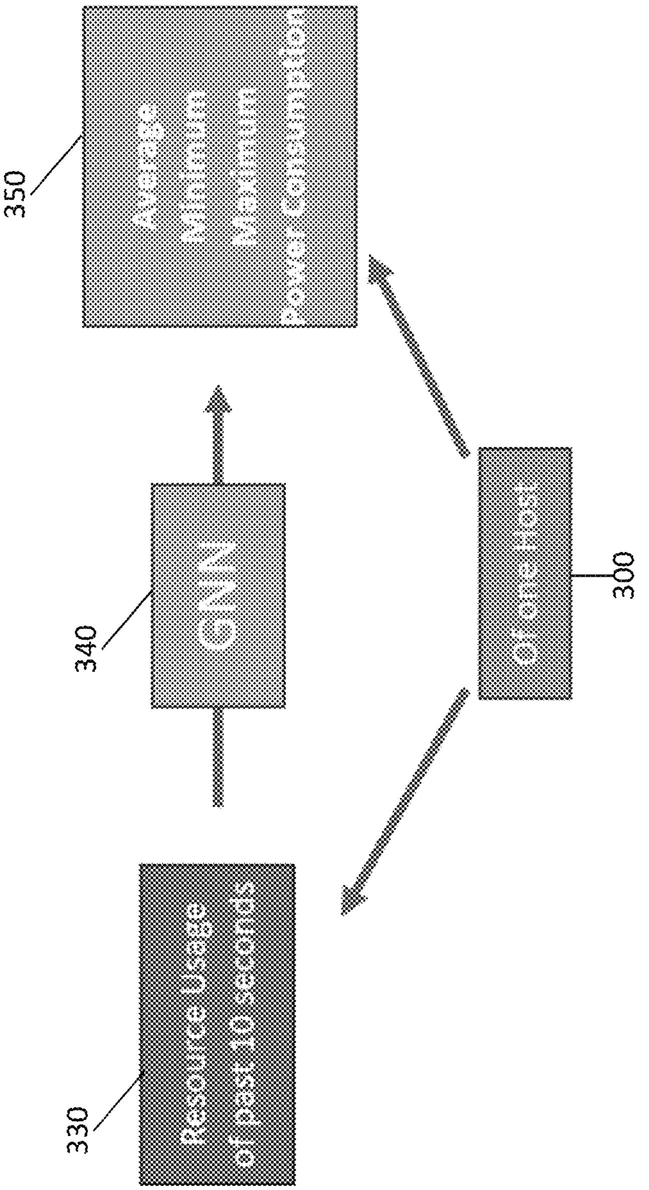
FIG. 3 illustrates a block diagram that shows the use of a graph model as an input into a GNN, and the processing of the graph model by the GNN, according to some implementations.

FIG. 3 illustrates a block diagram that shows the use of a graph model 330 as an input into a GNN 340, and the processing of the graph model 330 by the GNN 340 in order to make resource utilization (e.g., energy consumption) predictions. The graph model 330 may be generated by a system 300, wherein the graph model 330 may be similar to the graph model 230 described previously in FIG. 2B, and the system 300 may be similar to the systems 100 and 200 described previously in FIGS. 1 through 2B. The graph model 330 may include the resource utilization (e.g., energy consumption) of the system 300 over a time interval Tx (e.g., 10 seconds, or the like).

In other implementations, the graph model 330 may include the resource utilization (e.g., energy consumption) of a data center (e.g., comprising multiple hosts) over a time interval Tx (e.g., 10 seconds, or the like). In this case, the graph model 330 may be generated by the data center, and the graph model 330 is composed from a plurality of host graph models that represent individual hosts of the data center, respectively.

Graph models 330 may be generated by the system 300 after each time interval Tx, with each graph model 330 capturing the resource utilization during each respective time interval Tx. If the hardware configuration of the system 300 is changed (e.g., by adding new or replacing physical components like GPUs, FPGAs, or the like, or by removing physical components) during a time interval Tx, then a subsequently generated graph model 330 will show the changes in hardware configuration in the form of differences in the nodes and edges of the subsequently generated graph model 330. Because the graph models 330 are heterogeneous graphs, changes in resource utilization (e.g., energy consumption changes) as a result of changing the hardware configuration of the system 300 can therefore be captured in the graph models 330. Additionally, even if the hardware configuration of the system 300 is not changed, it is still possible to capture dynamic information that changes over time such as changes to resource utilization (e.g., a change in CPU usage, or the like) of the physical components of the system 300.

The graph model 330 generated by the system 300 after a time interval Tx can be used as an input for the GNN 340, which performs computations on the nodes and edges of the graph model 330 while considering both their own features and the features of the neighboring nodes and edges. The GNN 340 may be trained on several different hardware configurations and can be used for different prediction tasks (e.g. energy consumption predictions, carbon emission predictions, task classification, or the like). In FIG. 3, the GNN 340 may process the graph model 330 that is generated by the system 300, and produces an output 350. The output 350 may include estimations on the average energy consumption rate, the minimum energy consumption rate, and the maximum energy consumption rate of the system 300.

In other implementations, where the graph model 330 may capture the resource utilization (e.g., energy consumption) of a data center (e.g., comprising multiple hosts) over a time interval Tx (e.g., 10 seconds, or the like), the output 350 may include estimations on the average energy consumption rate, the minimum energy consumption rate, and the maximum energy consumption rate of the data center.

Figure 4A:
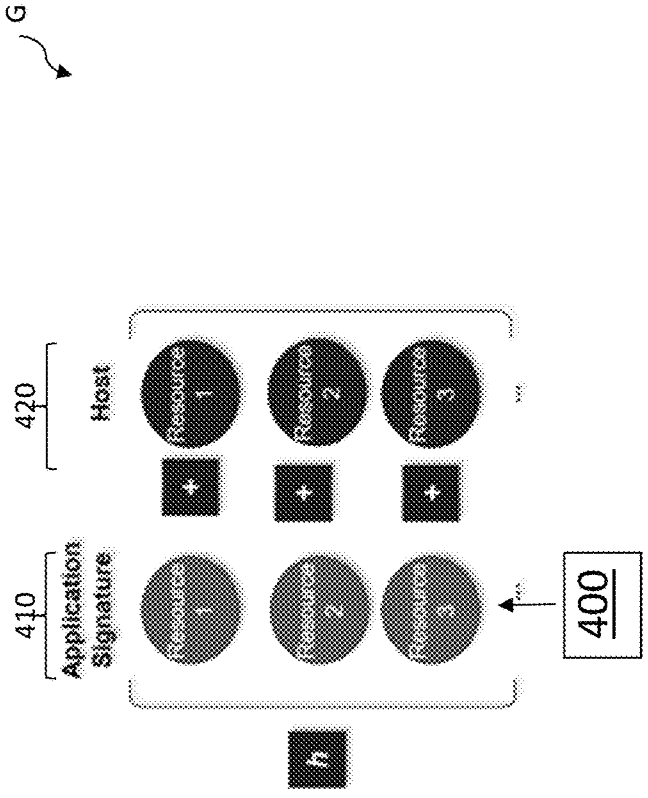
FIGS. 4A and 4B illustrate the combining of an application signature graph with a first graph model to produce a second graph model, and the processing of the second graph model by a GNN, according to some implementations.

FIG. 4A illustrates the combining of an application signature graph 410 with a first graph model 420 (also referred to as a first host graph) to produce a second graph model G (also referred to as a second host graph or a combined host graph). The application signature graph 410 may represent the isolated resource utilization of a single application 402 as it runs on a given system 400 (e.g., a single host) over a given time interval. For example, when the single application 402 is running on the system 400, the dynamic information (e.g., resource utilization) of the single application 402 can be monitored and captured over the given time interval (e.g., 10 seconds, or the like). The application signature graph 410 may be subsequently generated using the captured dynamic information, where the application signature graph 410 may include time-series data of the isolated resource utilization of the single application 402 while running for the given time interval (e.g., 10 seconds, or the like). The application signature graph 410 may be generated to include just a subset of the node types defined for the system 400. The first graph model 420 may be a graph that represents the hardware configuration of a system 422 and also runtime information, such as resource utilization of the system 422. The systems 400 and 422 (which may also be referred to as hosts) may be similar to the systems 100, 200, and 300 that were described previously in FIGS. 1 through 3.

The application signature graph 410 may be combined with the first graph model 420 to produce the second graph model G as its output, wherein the combining of the application signature graph 410 with the first graph model 420 can be defined by the function h below:

$$h: (ASG, GM1) \rightarrow G \qquad (1)$$

where ASG is the application signature graph 410, GM1 is the first graph model 420, and G is the second graph model G. The function h effectively combines the application signature graph 410 with the first graph model 420 by aggregating the feature vectors of the application signature graph 410 and the first graph model 420. The resulting second graph model G may represent the resource utilization of the system 422 as if the single application 402 was running on the system 422 (e.g., as a "what-if" estimation). The second graph model G can be used as an input into a GNN 440 (shown subsequently in FIG. 4B) that processes the second graph model G and produces an output. The output may include predictions on the energy consumption and/or the carbon emission of the system 422 as the single application 402 is running on the system 422.

In an implementation, a plurality of graph models can be composed to form a composed graph model. Each of the plurality of graph models may represent a single respective system (also referred to as a host) of a data center, and the composed graph model may represent the data center. The composed graph model may represent the hardware configuration of the data center and also runtime information, such as resource utilization of the systems that make up the data center. The composed graph model can be used as an input into a GNN that is trained to process the composed graph model and produce an output. The output may include predictions on the energy consumption and/or the carbon emission of the data center as the data center operates.

Figure 4B:
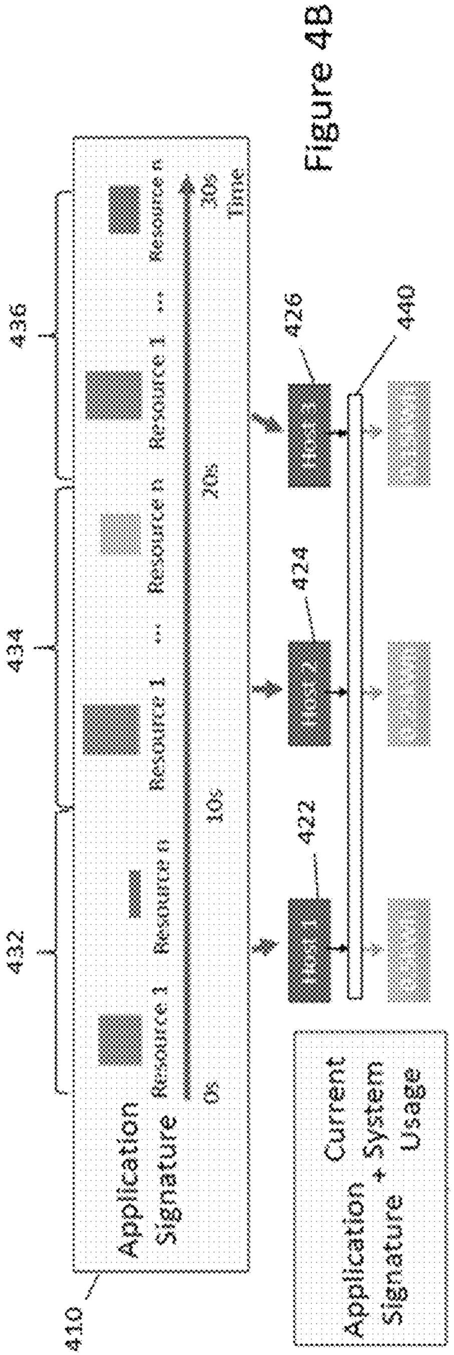

In FIG. 4B, the example application signature graph 410 is illustrated representing the isolated resource utilization of resources (e.g., resource 1, resource 2 . . . resource n) by the single application 402 as it runs on a data center over a time interval of 30 seconds. This time interval and utilization of resources is divided into smaller time intervals 432, 434, and 436 of, e.g., 10 seconds each. Portions of the application signature graph 410 that relate to each of the time intervals 432, 434, and 436 are effectively combined with the first graph model 420 of the system 422, a third graph model of a system 424, and a fourth graph model of a system 426, respectively, using the function h that was described above. The systems 422, 424, and 426 in the example of FIG. 4B may be individual hosts that form part of a data center. The three resulting graph models that are produced after combining the portions of the application signature graph 410 that relate to each of the time intervals 432, 434, and 436 with the first graph model 420, the third graph model, and the fourth graph model, respectively, are then used as an input into the GNN 440 that processes each of the three resulting graph models and produces three different outputs. Each of these three different outputs may include predictions of the energy consumption rate and carbon emission rate of a respective one of the system 422, the system 424, and the system 426, as the single application 402 is running on the system 422, the system 424, and the system 426, respectively, during the respective time intervals 432, 434, and 436. The GNN 440 may be similar to the GNN 340 that was described previously in FIG. 3. In this way, it is possible to obtain predictions on the energy consumption rate and carbon emission rate of the individual hosts (e.g., the system 422, the system 424, and the system 426) of a data center for when an application (e.g., the single application 402) is running on the data center.

The combining of the application signature graph 410 with the first graph model 420 to produce the second graph model G, and then subsequently using the second graph model G as an input into the GNN 440 may have advantages. The application signature graph 410 may be a graph representation of the isolated resource utilization of the single application 402 while running for a given time interval (e.g., 10 seconds, or the like), and the first graph model 420 may be a graph that represents the hardware configuration of the system 422 and also runtime information, such as resource utilization of the system 422. The resulting second graph model G may then represent the resource utilization of the system 422 as if the single application 402 was running on the system 422 (e.g., as a "what-if" estimation). The GNN 440 processes the second graph model G and produces an output that may include predictions on the energy consumption and/or the carbon emission of the system 422 as the single application 402 is running on the system 422. These advantages include being able to provide a flexible simulation capability to predict energy consumption and carbon emissions of any given system (e.g., the system 422) as if single applications (e.g., the single application 402) were running or being executed on the given system.

Figure 5:
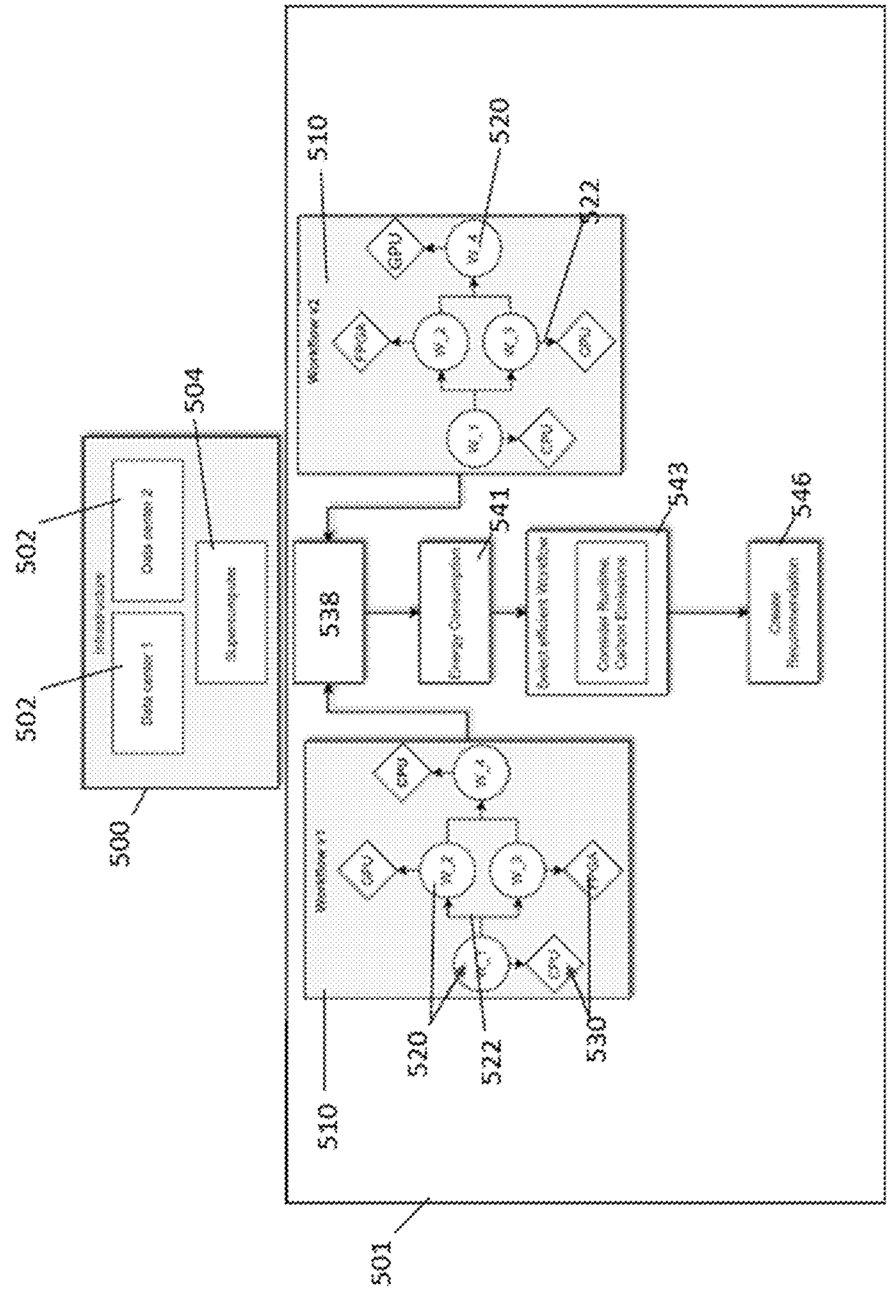
FIG. 5 illustrates a schematic of an integrated computing infrastructure, and a flow diagram that is used to evaluate different workflow configurations and identify an optimal workflow configuration to run on the integrated computing infrastructure, according to some implementations.

FIG. 5 illustrates a schematic of an integrated computing infrastructure 500. The integrated computing infrastructure may include one or more data centers 502. The integrated computing infrastructure 500 may also include a supercomputer 504 that operates in conjunction with the one or more data centers 502. FIG. 5 also illustrates a flow diagram 501 that is used to evaluate different workflow configurations 510 and identify an optimal workflow configuration 510 to run on the computing infrastructure 500 while considering desired resource utilization (e.g., energy consumption) and carbon emission thresholds.

The flow diagram 501 illustrates two different workflow configurations 510 that are to be evaluated in order to identify which of the two workflow configurations 510 has the optimal workflow configuration when considering desired resource utilization (e.g., energy consumption) and carbon emission thresholds. In other implementations, more than two different workflow configurations 510 may be evaluated in order to identify which of the workflow configurations 510 is the optimal workflow configuration. Each workflow configuration 510 is generated by combining a first model graph that represents the proposed hardware configuration (e.g., including physical components such as CPU's, FPGA's, or the like, of the hosts that make up the one or more data centers 502) with application signature graphs of applications that will run on the proposed hardware configuration.

Each of the workflow configurations 510 may be a graph model, and may represent a proposed hardware configuration (e.g., including physical components such as CPUs, FPGAs, or the like, of the hosts that make up the one or more data centers 502) of the respective workflow configuration 510 in a graph form, as one or more applications are running on the proposed hardware configuration. In an implementation, each first model graph may be a graph model composed from a plurality of graphs, where each of the plurality of graph models is generated to represent a hardware configuration of a single host of the one or more data centers 502. The graph model of each workflow configuration 510 may be a directed acyclic graph (e.g., in the form of a sequence) that also include nodes 520. Each node 520 represents a respective workload that can run on the proposed hardware configuration. A workload may be an application that needs to be managed in the one or more data centers 502. Each workflow configuration 510 may include directed edges 522 that indicate the order in which workloads (represented by the nodes 520) of the respective workflow configuration 510 must be executed. The different proposed workflow configurations 510 may therefore include different respective hardware configurations that are being evaluated to find the optimal hardware configuration on which to execute these workloads, as well as the optimal order of executing (e.g., scheduling) these workloads.

Each workload represented by a node 520 is also associated with a respective application signature graph that may be similar to the application signature graph 410 described previously in FIGS. 4A and 4B. The application signature graph may be generated to be a graph representation of the isolated resource utilization of the workload while running for a given time interval (e.g., 10 seconds, or the like). Each workflow configuration 510 is generated by combining the application signature graphs of the workloads that are required to be executed by a proposed hardware configuration with the respective first model graph that represents the proposed hardware configuration (e.g., including physical components such as CPU's, FPGA's, or the like, of the hosts that make up the one or more data centers 502). In this way, the workflow configuration 510 may represent the resource utilization (e.g., the energy consumption) of the one or more data centers 502 as if (e.g., a "what-if" estimation) the workflow configuration 510 was running on the one or more data centers 502.

In a step 538 of the flow diagram 501, each prospective workflow configuration 510 may be used as an input for a GNN, which performs computations on the nodes 520 (i.e., the workloads represented by the nodes 520) and the directed edges 522 of the prospective workflow configuration 510 while considering both their own features and the features of the neighboring nodes 520 and directed edges 522. The GNN may be trained on several different hardware configurations and can be used for different prediction tasks (e.g. energy consumption predictions, carbon emission predictions, task classification, or the like). In the step 538 of the flow diagram 501, the GNN processes each prospective workflow configuration 510. In a step 541 of the flow diagram 501, the GNN produces a respective output for each prospective workflow configuration 510 that it has processed. The respective output may include predictions on the energy consumption rate and the carbon emission rate as if the prospective workflow configuration 510 was running on the one or more data centers 502 of the integrated computing infrastructure 500.

An appropriate search algorithm may be utilized to navigate the space of prospective workflow configurations 510, and can be used to evaluate the different prospective workflow configurations 510 based on their output after processing by the GNN to find the optimal one. In a step 543 of the flow diagram 501, an input is provided to the search algorithm that defines the desired energy consumption and/or carbon emission thresholds that are to be met by the prospective workflow configurations 510. The input may also define performance requirements (e.g., energy efficiency) thresholds that are to be met by the prospective workflow configurations 510. The search algorithm can then use the outputs to evaluate the prospective workflow configurations 510 based on whether they meet the desired energy consumption and/or carbon emission thresholds that were defined in the input. In an implementation, the search algorithm can also use the outputs to evaluate the prospective workflow configurations 510 based on whether they meet the performance requirements (e.g., energy efficiency) thresholds that were defined in the input. After the evaluation, the search algorithm will identify the prospective workflow configurations 510 that fall within the desired energy consumption and/or carbon emission thresholds, and/or identify the prospective workflow configurations 510 that fall within the performance requirements (e.g., energy efficiency) thresholds.

In a step 546 of the flow diagram 501, based on the evaluation and identification of the prospective workflow configurations 510 in the step 543, the search algorithm then creates a recommendation for the optimal workflow configuration 510 to run on the one or more data centers 502 of the integrated computing infrastructure 500, in order to meet the desired energy consumption and/or carbon emission thresholds that were defined in the input and/or in order to meet the performance requirements (e.g., energy efficiency) thresholds that were defined in the input. In other implementations, in the step 546 of the flow diagram 501, based on the evaluation and identification of the prospective workflow configurations 510 in the step 543, the search algorithm may select an optimal workflow configuration 510 to be deployed to the one or more data centers 502 of the integrated computing infrastructure 500, in order to meet the desired energy consumption and/or carbon emission thresholds that were defined in the input and/or in order to meet the performance requirements (e.g., energy efficiency) thresholds that were defined in the input.

In an implementation, the evaluation described above in the flow diagram 501 to evaluate different workflow configurations 510 in order to identify which of the workflow configurations 510 has the optimal workflow configuration when considering desired resource utilization (e.g., energy consumption) and carbon emission thresholds can also be applied to carbon and energy-aware scheduling. For example, "what-if" estimates can be used to predict the energy consumption and carbon emission of the one or more data centers as the workloads (e.g., the applications) run on the one or more data centers 502, and these predictions may be used to schedule, delay, or even re-arrange the order of execution of the workflow configurations 510 (and hence the applications within the workflow configurations 510). This allows for adaptability during runtime, and the ability to respond to the changing environment in which the application is running in.

In an implementation, "what-if" estimates can also be used to predict the energy consumption and carbon emission of a host or a data center as applications run on the host or the data center, and these predictions may be used to build proactive carbon and energy aware autoscalers. For example, vertical autoscaling techniques may lead to an increase in energy consumption when allocating more resources to a host, and horizontal autoscaling techniques may also lead to increases in energy consumption due to the addition of additional hosts. It is therefore advantageous to be able to predict the increase in energy consumption during this autoscaling to ensure the vertical and horizontal autoscaling techniques that are applied do not lead to the exceeding of energy consumption thresholds.

In an implementation, it may be advantageous to generate a digital twin of a data center, which is a virtual representation or mirror image of the physical data center infrastructure, its components, and operational processes. A digital twin is a dynamic, real-time simulation that mimics the behavior and status of the actual data center.

Figure 6:
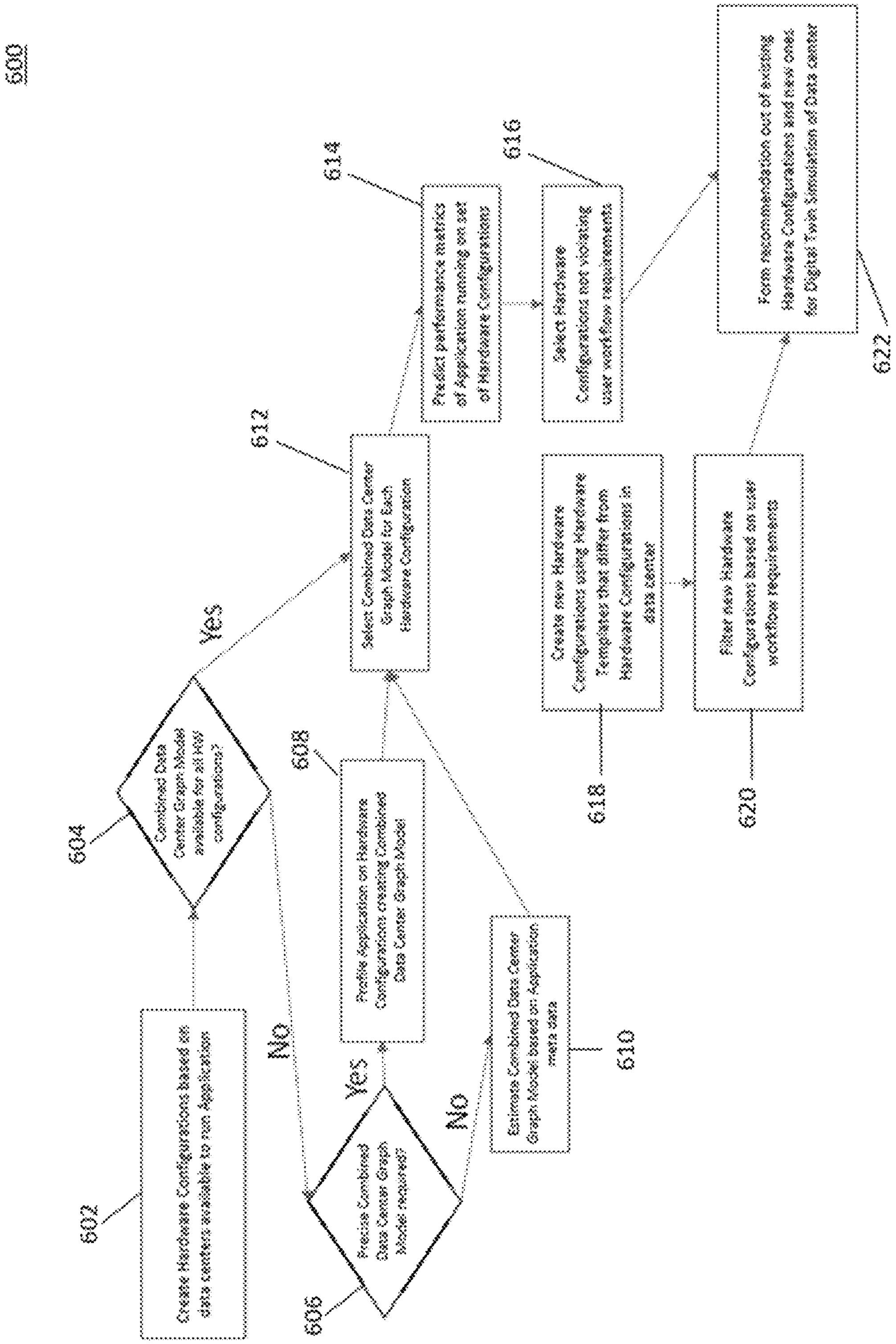
FIG. 6 illustrates a flowchart for a graph-model based prediction process that is used to generate a recommendation for a data center hardware configuration to be simulated as a digital twin, according to some implementations.

FIG. 6 illustrates a flowchart 600 for a graph-model based prediction process that is used to generate a recommendation for a data center hardware configuration to be simulated as a digital twin. A digital twin may be used to model the real world (e.g., a data center) in the virtual space and enable analysis of the data center. The digital twin also allows the simulating of possible future outcomes for the data center if the data center was to be placed in operation. There may be several prospective digital twin scenarios having different hardware configurations that need to be evaluated, and because there may be a high number of hardware configurations to be evaluated with a large number of plausible simulations, it becomes advantageous to be able to quickly filter out infeasible digital twin scenarios and identify candidate digital twin scenarios to simulate. In this way, a need to simulate all the digital twin scenarios is removed, while still being able to identify candidate digital twin scenarios to simulate that fall within desired resource utilization (e.g., energy consumption) and carbon emission thresholds.

The graph-model based prediction process shown in the flowchart 600 utilizes first graph models to represent prospective hardware configurations that may be used in digital twin scenarios. In an implementation, each first graph model may represent a prospective hardware configuration for an entire data center. Each first graph model may be combined with an application signature graph to produce a combined data center graph model. The application signature graph may represent the isolated resource utilization (e.g., the energy consumption) of a single application as it runs over a given time interval. The combined data center graph model may then represent the resource utilization of the respective hardware configuration as if the application was running on the respective hardware configuration (e.g., as a "what-if" estimation). In block 602 of the flowchart 600, a set of different prospective hardware configurations may be defined that are already available to run an application. Each of the prospective hardware configurations may be a possible candidate to be used to simulate a digital twin, and are represented by respective first graph models. In block 604 of the flowchart 600, a determination may be performed to check if a combined data center graph model is available for each of the prospective hardware configurations that is a possible candidate to be used to simulate a digital twin.

If it is determined in the block 604 of the flowchart 600 that a combined data center graph model is not available for at least one of the prospective hardware configurations, then a further determination may be performed in block 606 of the flowchart 600 to check if a precise combined data center graph model is required for that prospective hardware configuration. A precise combined data center graph model may be utilized when highly accurate predictions on resource utilization (e.g., energy consumption) and carbon emissions for the prospective hardware configuration are desired. If it is determined in block 606 of the flowchart 600 that a precise combined data center graph model is required for the prospective hardware configuration that did not have a combined data center graph model, then in block 608 of the flowchart 600, the application may be profiled on that hardware configuration in order to systematically collect and analyze data about the runtime behavior, resource usage, and performance characteristics of the application as it runs on the hardware configuration, and a combined data center graph model is then generated that may represent the resource utilization of the hardware configuration as if the application was running on the hardware configuration. If it is determined in block 606 of the flowchart 600 that a precise combined data center graph model is not required for the prospective hardware configuration that did not have a combined data center graph model, then in block 610 of the flowchart 600, a combined data center graph model for the prospective hardware configuration may be estimated using a respective first graph model that represents the prospective hardware configuration, and metadata of the application. Therefore, a combined data center graph model may be generated for any prospective hardware configuration that is missing a combined data center graph model by either profiling the application on the prospective hardware configuration or estimating the combined data center graph model for the prospective hardware configuration.

If the steps in one or more of the block 604, block 608, and block 610 of the flowchart are performed and a combined data center graph model is available for each of the prospective hardware configurations, then in block 612 of the flowchart 600, each of the respective combined data center graph models for the prospective hardware configurations that are possible candidates to be used to simulate digital twins is then selected for use as an input to a GNN. In block 614 of the flowchart 600, the GNN processes each of the combined data center graph models and produces an output for each respective combined data center graph model that it has processed. The GNN may be trained on several different hardware configurations and each output may include energy consumption predictions, carbon emission predictions, and performance metric predictions for a respective hardware configuration as if the application was running on the respective hardware configuration.

In block 616 of the flowchart 600, an appropriate search algorithm may be utilized to navigate the space of prospective hardware configurations, and can be used to evaluate the different prospective hardware configurations based on the respective outputs from the GNN. An input may be provided by a user to the search algorithm that defines the desired energy consumption and/or carbon emission thresholds that are to be met by the prospective hardware configuration while running the application. The input may also define performance requirements (e.g., energy efficiency) thresholds that are to be met by the prospective hardware configuration while running the application. Further, in block 616 of the flowchart 600, the search algorithm can then select the prospective hardware configurations (e.g., candidate hardware configurations) that fall within the desired energy consumption and/or carbon emission thresholds and/or meet performance requirements, while excluding and filtering out the other hardware configurations.

In block 618 of the flowchart 600, one or more new hardware configurations that depict a data center may be generated. These new hardware configurations may be generated from a hardware template, and may be different from the prospective hardware configurations that were already available and that were defined previously in block 602 of the flowchart 600. The hardware template may include a set of hardware configuration blueprints, wherein each hardware configuration blueprint includes the hardware configuration of a single host. The new hardware configurations may be randomly generated using the set of hardware configuration blueprints. In addition, the new hardware configurations that are generated may include homogeneous data centers and/or heterogeneous data centers. In block 620 of the flowchart 600, the search algorithm evaluates the new hardware configurations generated in the block 618 of the flowchart 600, any of the new hardware configurations that are projected to fail to meet desired energy consumption and/or carbon emission thresholds and/or meet performance requirements (e.g., from the input provided by the user to the search algorithm) are filtered out, and only the new hardware configurations that are projected to meet desired energy consumption and/or carbon emission thresholds and/or meet performance requirements are selected by the search algorithm.

In block 622 of the flowchart 600, the search algorithm creates a recommendation for the optimal data center hardware configuration to be simulated as a digital twin from the selected ones of the prospective hardware configurations (the candidate hardware configurations) in the block 616 of the flowchart 600, and the selected ones of the new hardware configurations in the block 620 of the flowchart 600.

FIG. 7 illustrates an example method 700 for processing a graph model (e.g., a workflow configuration 510 described in FIG. 5) using a GNN to make predictions, and scheduling an application (e.g., a workload of the workflow configuration 510) based on the predictions, according to certain implementations In step 710, a plurality of host graphs are generated, the host graphs representing resources of hosts of a data center. For example, a plurality of graphs are generated, where each of the plurality of graphs represents a hardware configuration of a single host of the one or more data centers 502 (described previously in FIG. 5).

In step 720, the plurality of host graphs are composed to form a single graph that represents resources of the data center. For example, a workflow configuration 510 (described previously in FIG. 5) is created by composing the plurality of graphs.

In step 730, a signature graph is generated, the signature graph being a representation of the isolated resource utilization of an application. For example, an application signature graph (described previously in FIG. 5) may be generated to be a graph representation of the isolated resource utilization of an application if it was to run for a given time interval.

In step 740, the signature graph is combined with the single graph to produce a second graph, the second graph representing the resource utilization of the hosts as if the application was running on the hosts of the data center. For example, one or more application signature graphs of respective workloads that are required to be executed by a proposed hardware configuration are combined with a respective first model graph that represents the proposed hardware configuration (e.g., including physical components such as CPU's, FPGA's, or the like, of the hosts that make up the one or more data centers 502) to generate the workflow configuration 510. The workflow configuration 510 represents the resource utilization (e.g., the energy consumption) of the one or more data centers 502 as if (e.g., a "what-if" estimation) the workflow configuration 510 (e.g., including the application) was running on the one or more data centers 502.

In step 750, the second graph is processed using a graph neural network (GNN) to obtain predictions on energy consumption and carbon emissions of each of the hosts as if the application was running on the data center. For example, the workflow configuration 510 may be used as an input for the GNN (described previously in FIG. 5), and the GNN processes the workflow configuration 510 and produces an output (described previously in FIG. 5) that may include predictions on the energy consumption rate and the carbon emission rate if the workflow configuration 510 (e.g., including the application) was running on the one or more data centers 502.

In step 760, the application is scheduled on the hosts of the data center based on the energy consumption and carbon emission predictions. For example, the workflow configuration 510 (e.g., including the application) may be scheduled or delayed to run on the one or more data centers 502 based on the energy consumption and carbon emission predictions.

Figure 8:
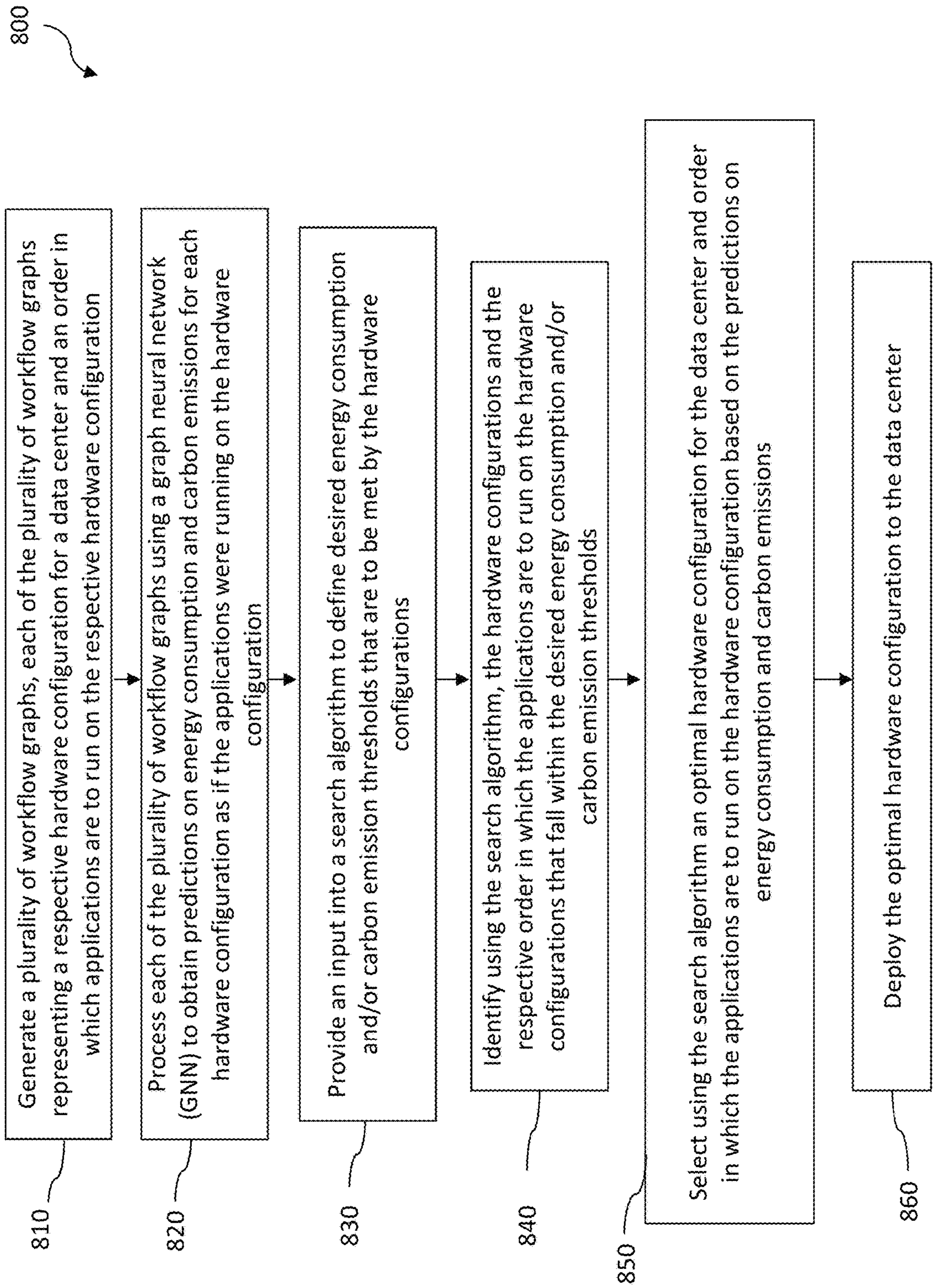
FIG. 8 illustrates an example method for processing workflow graphs using a GNN to make predictions according to some implementations.

FIG. 8 illustrates an example method 800 for processing workflow graphs (e.g., workflow configurations 510 described previously in FIG. 5)) using a GNN (e.g., the GNN described previously in FIG. 5) to make predictions, the workflow graphs representing different data center hardware configurations while applications are running on the different data center hardware configurations, and identifying an optimal data center hardware configuration and order in which applications are to run on the hardware configuration based on the predictions, according to some implementations.

In step 810, a plurality of workflow graphs are generated, each of the plurality of workflow graphs representing a respective hardware configuration for a data center and an order in which applications are to run on the respective hardware configuration. For example, a plurality of workflow configurations 510 may be generated, wherein each workflow configuration 510 may represent a proposed hardware configuration (e.g., including physical components such as CPUs, FPGAs, or the like, of the hosts that make up the one or more data centers 502) of the respective workflow configuration 510 in a graph form. Each workflow configuration 510 may include nodes 520 that represent applications, and edges 522 that indicate the order in which the applications must be executed.

In step 820, each of the plurality of workflow graphs is processed using a graph neural network (GNN) to obtain predictions on energy consumption and carbon emissions for each hardware configuration as if the applications were running on the hardware configuration. For example, each workflow configuration 510 may be used as an input for the GNN, which processes each workflow configuration 510 and produces the respective output (described previously in FIG. 5) for each workflow configuration 510 that it has processed. The respective output may include predictions on the energy consumption rate and the carbon emission rate as if the workflow configuration 510 was running on the one or more data centers 502 of the integrated computing infrastructure 500.

In step 830, an input is provided into a search algorithm to define desired energy consumption and/or carbon emission thresholds that are to be met by the hardware configurations. For example, an input (described previously in FIG. 5) that defines the desired energy consumption and/or carbon emission thresholds that are to be met by the workflow configurations 510 is provided to the search algorithm. The input may also define performance requirements (e.g., energy efficiency) thresholds that are to be met by the workflow configurations 510.

In step 840, the hardware configurations and the respective order in which the applications are to run on the hardware configurations that fall within the desired energy consumption and/or carbon emission thresholds are identified using the search algorithm. For example, the search algorithm may use the outputs (described previously in FIG. 5) to evaluate the workflow configurations 510 based on whether they meet desired energy consumption and/or carbon emission thresholds that were defined in the input. After the evaluation, the search algorithm will identify the prospective workflow configurations 510 that fall within the desired energy consumption and/or carbon emission thresholds, and/or identify the workflow configurations 510 that fall within the performance requirements (e.g., energy efficiency) thresholds.

In step 850, an optimal hardware configuration for the data center and order in which applications are to run on the hardware configuration is selected by the search algorithm based on the predictions on energy consumption and carbon emissions. For example, the search algorithm selects the optimal workflow configuration 510 to run on the one or more data centers 502 of the integrated computing infrastructure 500, in order to meet the desired energy consumption and/or carbon emission thresholds that were defined in the input.

In step 860, the optimal hardware configuration is deployed to the data center. For example, the optimal workflow configuration 510 selected by the search algorithm in step 850 is deployed to the one or more data centers 502.

Figure 9:
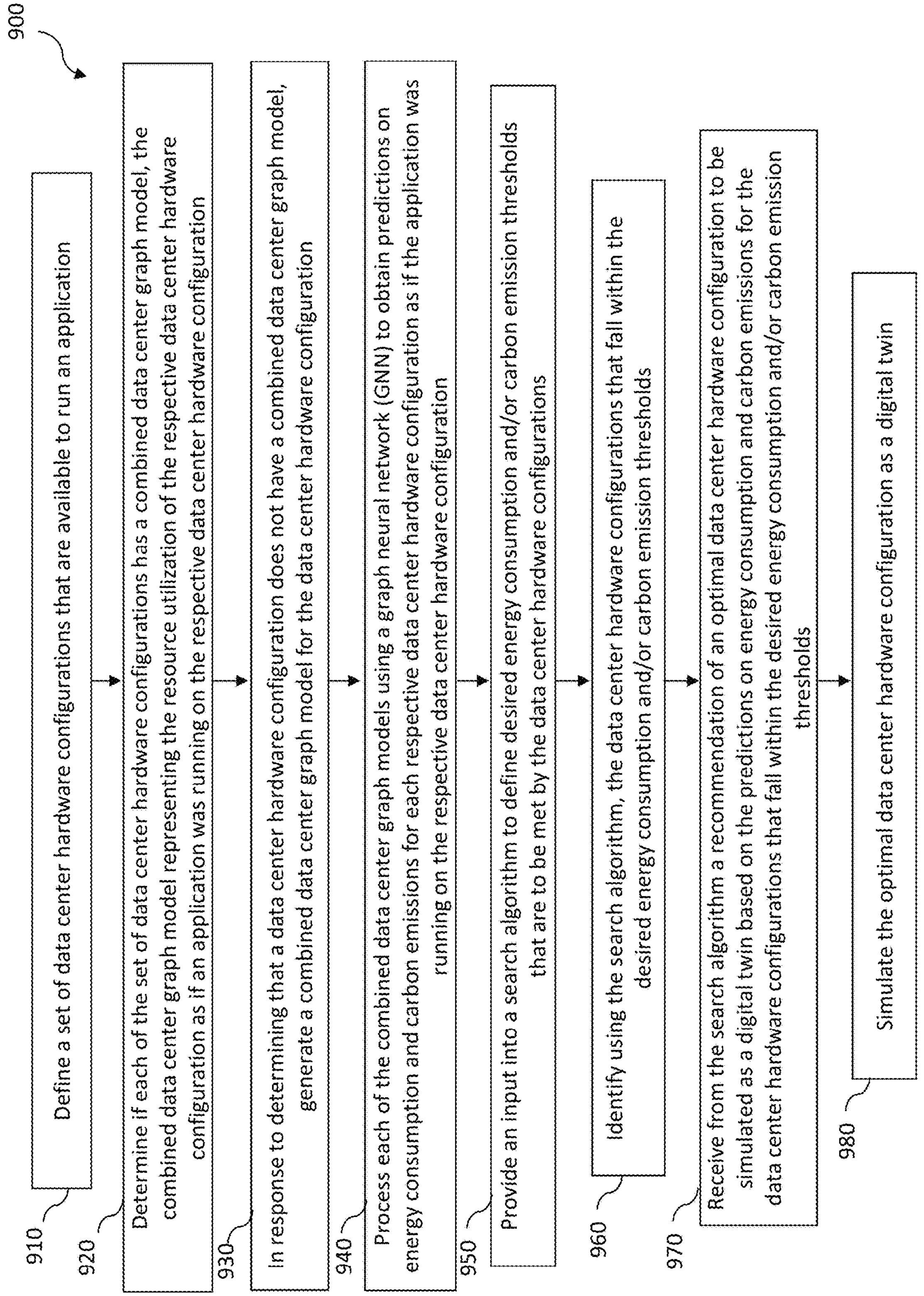
FIG. 9 illustrates an example method for processing combined data center graph models using a GNN to make predictions, according to some implementations.

FIG. 9 illustrates an example method 900 for processing combined data center graph models (described previously in FIG. 6) using the GNN (described previously in FIG. 6) to make predictions, the combined data center graph models representing resource utilizations of different data center hardware configurations as if the application (described previously in FIG. 6) was running on the different data center hardware configurations, and identifying an optimal data center hardware configuration to be simulated as a digital twin based on the predictions, according to some implementations.

In step 910, a set of data center hardware configurations that are available to run an application are defined. For example, a set of different prospective hardware configurations may be defined that are already available to run an application. Each of the prospective hardware configurations may be a possible candidate to be used to simulate a digital twin.

In step 920, a determination is made to check if each of the set of data center hardware configurations has a combined data center graph model, the combined data center graph model representing the resource utilization of the data center hardware configuration as if an application was running on the data center hardware configuration. For example, a determination may be performed to check if a combined data center graph model is available for each of the prospective hardware configurations that is a possible candidate to be used to simulate a digital twin. The respective combined data center graph model may be a graph representation of the resource utilization (e.g., the energy consumption) of the prospective data center hardware configuration as if (e.g., a "what-if" estimation) the application was running on the prospective data center hardware configuration.

In step 930, a combined data center graph model for the data center hardware configuration is generated in response to determining that a data center hardware configuration does not have a combined data center graph model. For example, a combined data center graph model may be generated for any prospective hardware configuration that is missing a combined data center graph model by either profiling the application on the prospective hardware configuration or estimating the combined data center graph model for the prospective hardware configuration.

In step 940, each of the combined data center graph models is processed using a graph neural network (GNN) to obtain predictions on energy consumption and carbon emissions for each data center hardware configuration as if the application was running on the hardware configuration. For example, each of the combined data center graph models for the prospective hardware configurations that are possible candidates to be used to simulate digital twins are selected for use as an input to a GNN. The GNN may process each of the respective combined data center graph models for the prospective hardware configurations and produce an output for each respective combined data center graph model that it has processed. Each output may include energy consumption predictions, carbon emission predictions, and performance metric predictions for a respective hardware configuration as if the application was running on the respective hardware configuration.

In step 950, desired energy consumption and/or carbon emission thresholds that are to be met by the data center hardware configurations are defined by providing an input into a search algorithm. For example, the input may be provided by a user to the search algorithm that defines the desired energy consumption and/or carbon emission thresholds that are to be met by the prospective hardware configuration while running the application. The input may also define performance requirements (e.g., energy efficiency) thresholds that are to be met by the prospective hardware configuration while running the application.

In step 960, candidate data center hardware configurations that fall within the desired energy consumption and/or carbon emission thresholds are identified using the search algorithm. For example, the search algorithm can then select the prospective hardware configurations that fall within the desired energy consumption and/or carbon emission thresholds and/or meet performance requirements, while excluding and filtering out the other hardware configurations.

In step 970, a recommendation is received from the search algorithm of an optimal data center hardware configuration to be simulated based on the predictions on energy consumption and carbon emissions for the data center hardware configurations that fall within the desired energy consumption and/or carbon emission thresholds. For example, the search algorithm may create a recommendation for the optimal data center hardware configuration to be simulated as a digital twin from the selected ones of the prospective hardware configurations (e.g., the candidate data center hardware configurations from the step 960) that fall within the desired energy consumption and/or carbon emission thresholds.

In step 980, the candidate data center hardware configuration selected by the search algorithm in step 970 may be simulated as a digital twin. For example, the candidate data center hardware configuration may be simulated as a virtual representation or mirror image of the physical data center infrastructure, its components, and operational processes. The digital twin is a dynamic, real-time simulation that mimics the behavior and status of the actual data center.

In an example implementation, a method includes generating a first data center graph comprising a plurality of host graphs, the host graphs representing resources of hosts of a data center; combining the first data center graph with an application signature graph to produce a second data center graph, the second data center graph representing the resource utilization of an application when running on the data center; predicting an energy consumption of the application when running on the data center by processing the second data center graph using a graph neural network (GNN); and scheduling the application on the hosts of the data center based on the predicted energy consumption of the application. In some implementations, the method further includes composing the host graphs to form the first data center graph, the first data center graph representing static and dynamic resources of the data center. In some implementations, the method further includes generating the application signature graph, the application signature graph representing an isolated resource utilization of the application. In some implementations, the method further includes predicting carbon emissions of the data center when running the application on the data center by processing the second data center graph using the GNN. In some implementations of the method, the second data center graph includes a node that represents the application, and the second data center graph further includes edges that indicate an order in which the application is to be run on the data center. In some implementations of the method, processing the second data center graph using the GNN includes using the second data center graph as an input for the GNN, the GNN performing computations on the node and the edges of the second data center graph.

In an example implementation, a method includes generating a plurality of workflow graphs, each of the workflow graphs representing a respective hardware configuration for a data center and an order in which applications are to run on the respective hardware configuration; processing each of the workflow graphs using a graph neural network (GNN) to obtain predictions on energy consumption for each hardware configuration as if the applications were running on the hardware configuration; providing an input into a search algorithm to define desired energy consumption thresholds that are to be met by the hardware configurations; in response to providing the input into the search algorithm, selecting using the search algorithm an optimal hardware configuration for the data center and order in which the applications are to run on the hardware configuration based on the predictions on energy consumption; and deploying the optimal hardware configuration to the data center. In some implementations the method further includes processing each of the workflow graphs using the GNN to obtain predictions of carbon emissions for each hardware configuration as if the applications were running on the hardware configuration. In some implementations the method further includes providing an input into the search algorithm to define desired carbon emission thresholds that are to be met by the hardware configurations. In some implementations, the method further includes identifying using the search algorithm, the hardware configurations and the respective order in which the applications are to run on the hardware configurations that fall within the desired energy consumption thresholds and carbon emission thresholds. In some implementations of the method, each workflow graph of the workflow graphs includes a plurality of graphs, and where each of the graphs represents a hardware configuration of a host of the data center. In some implementations of the method, each workflow graph of the workflow graphs includes a directed acyclic graph. In some implementations of the method, each workflow graph of the workflow graphs includes nodes that represent respective applications that can run on the hardware configuration that is represented by the workflow graph. In some implementations of the method, each workflow graph of the workflow graphs includes edges that represent an order in which applications of the workflow graph are to be executed.

In an example implementation, a method includes defining a set of data center hardware configurations that are available to run an application; determining whether each data center hardware configuration of the set of data center hardware configurations has a combined data center graph model, the combined data center graph model representing a resource utilization of the respective data center hardware configuration as if an application was running on the respective data center hardware configuration; processing each of the combined data center graph models using a graph neural network (GNN) to give predictions on energy consumption and carbon emissions for each respective data center hardware configuration; providing an input into a search algorithm to define desired energy consumption and carbon emission thresholds that are to be met by the data center hardware configurations; receiving from the search algorithm a recommendation of an optimal data center hardware configuration to be simulated as a digital twin based on the predictions on energy consumption and carbon emissions; and simulating the optimal data center hardware configuration as a digital twin. In some implementations the method further includes in response to determining that a data center hardware configuration of the set of data center hardware configurations does not have a combined data center graph model, generating a combined data center graph model for the data center hardware configuration. In some implementations of the method, generating the combined data center graph model for the data center hardware configuration includes profiling the application on the data center hardware configuration. In some implementations of the method, generating the combined data center graph model for the data center hardware configuration includes estimating the combined data center graph model using metadata of the application. In some implementations, the method further includes identifying using the search algorithm, the data center hardware configurations that fall within the desired energy consumption and carbon emission thresholds. In some implementations, the method further includes randomly generating a set of new data center hardware configurations from a hardware template, the hardware template including a set of hardware configuration blueprints, where each hardware configuration blueprint includes a hardware configuration of a single host; providing an input into the search algorithm to define desired energy consumption and carbon emission thresholds that are to be met by the new data center hardware configurations; and identifying using the search algorithm, the new data center hardware configurations that fall within the desired energy consumption and carbon emission thresholds.

The foregoing outlines features of several examples so that those skilled in the art may better understand the aspects of the present disclosure. Various modifications and combinations of the illustrative examples, as well as other examples, will be apparent to persons skilled in the art upon reference to the description. It is therefore intended that the appended claims encompass any such modifications.

What is claimed is:

1. A computer-implemented method comprising:

generating, using a computer system, a first data center graph comprising a plurality of host graphs, the host graphs representing resources of first hosts of a data center;

combining, using the computer system, the first data center graph with an application signature graph to produce a second data center graph, the application signature graph representing isolated resource utilization of an application and having been generated according to execution of the application on a second host that is distinct from the first hosts of the data center, wherein the application signature graph includes time-series data of the isolated resource utilization of the application captured over a given time interval while the application is being executed on the second host, the second data center graph representing the resource utilization of the application when running on the data center;

predicting, using the computer system, an energy consumption of the application when running on the data center by processing the second data center graph using a graph neural network (GNN);

scheduling, using the computer system, the application on the first hosts of the data center based on the predicted energy consumption of the application; and executing the scheduled application on the first hosts of the data center.

2. The computer-implemented method of claim 1, further comprising:

composing the host graphs to form the first data center graph, the first data center graph representing static and dynamic resources of the data center.

3. The computer-implemented method of claim 1, further comprising:

predicting carbon emissions of the data center when running the application on the data center by processing the second data center graph using the GNN.

4. The computer-implemented method of claim 3, wherein combining the first data center graph with the application signature graph comprises aggregating the feature vectors of the application signature graph and the first data center graph.

5. The computer-implemented method of claim 4, wherein processing the second data center graph using the GNN comprises using the second data center graph as an input for the GNN, the GNN performing computations on the node and the edges of the second data center graph.

6. The computer-implemented method of claim 1, wherein the GNN is trained on multiple hardware configurations to perform energy consumption prediction tasks.

7. The computer-implemented method of claim 1, wherein the predicted energy consumption of the application when running on the data center includes predictions for average, minimum, and maximum energy consumption values.

8. A computer-implemented method, comprising:

generating, by a computer system, a data center graph model comprising a plurality of graphs representing resources of hosts in a data center;

combining, using the computer system, the data center graph model with a signature graph to produce a combined graph, the signature graph representing isolated resource utilization of an application and having been generated according to execution of the application on a host external to the data center, wherein the signature graph includes time-series data of the isolated resource utilization of the application captured over a given time interval while the application is being executed on the host external to the data center, the combined graph representing resource utilization of the application when running on the hosts in the data center;

simulating, using the computer system, energy consumption of the application when running on the hosts in the data center by processing the combined graph using a graph neural network (GNN);

scheduling, by the computer system, the application on the hosts in the data center based on the simulated energy consumption; and executing the scheduled application on the hosts in the data center.

9. The computer-implemented method of claim 8, further comprising:

composing the plurality of graphs to form the data center graph model, the data center graph model representing static and dynamic resources of the data center.

10. The computer-implemented method of claim 8, further comprising:

simulating carbon emissions of the data center when running the application on the hosts in the data center by processing the combined graph using the GNN.

11. The computer-implemented method of claim 10, wherein combining the data center graph model with the signature graph comprises aggregating feature vectors of the signature graph and feature vectors of the data center graph model.

12. The computer-implemented method of claim 11, wherein processing the combined graph using the GNN comprises using the combined graph as an input for the GNN, the GNN performing computations on the node and the edges of the combined graph.

13. The computer-implemented method of claim 8, wherein the simulated energy consumption of the application when running on the hosts in the data center is obtained without the application being executed on any of the hosts in the data center.

14. The computer-implemented method of claim 8, wherein the GNN is trained on multiple hardware configurations to perform energy consumption prediction tasks.

15. A system, comprising:

one or more processors; and one or more non-transitory computer-readable storage media storing programming for execution by the one or more processors, the programming comprising instructions to:

generate a first data center graph comprising a plurality of host graphs, the host graphs representing resources of first hosts of a data center;

combine the first data center graph with an application signature graph to produce a second data center graph, the application signature graph representing isolated resource utilization of an application and having been generated according to execution of the application on a second host that is distinct from the first hosts of the data center, wherein the application signature graph includes time-series data of the isolated resource utilization of the application captured over a given time interval while the application is being executed on the second host, the second data center graph representing the resource utilization of the application when running on the data center;

predict an energy consumption of the application when running on the data center by processing the second data center graph using a graph neural network (GNN);

schedule the application on the first hosts of the data center based on the predicted energy consumption of the application; and execute the scheduled application on the first hosts of the data center.

16. The system of claim 15, wherein the programming comprises further instructions to:

compose the host graphs to form the first data center graph, the first data center graph representing static and dynamic resources of the data center.

17. The system of claim 15, wherein the programming further comprises instructions to:

predict carbon emissions of the data center when running the application on the data center by processing the second data center graph using the GNN.

18. The system of claim 17, wherein combining the first data center graph with the application signature graph comprises aggregating feature vectors of the application signature graph and feature vectors of the first data center graph.

19. The system of claim 18, wherein processing the second data center graph using the GNN comprises using the second data center graph as an input for the GNN, the GNN performing computations on the node and the edges of the second data center graph.

20. The system of claim 15, wherein the predicted energy consumption of the application when running on the data center is obtained without executing the application on any of the first hosts of the data center.

* * * * *